(12) United States Patent
Grubbs et al.

(10) Patent No.: US 8,570,327 B2
(45) Date of Patent: Oct. 29, 2013

(54) SYSTEMS AND METHODS INVOLVING GRAPHICALLY DISPLAYING CONTROL SYSTEMS

(75) Inventors: Robert William Grubbs, Roanoke, VA (US); Andre Steven DeMaurice, Salem, VA (US); Ashish Vijay Devgan, Maharashtra (IN)

(73) Assignee: General Electric Company, Schenectady, NY (US)

( * ) Notice: Subject to any disclaimer, the term of this patent is extended or adjusted under 35 U.S.C. 154(b) by 714 days.

(21) Appl. No.: 12/271,343

(22) Filed: Nov. 14, 2008

(65) Prior Publication Data

US 2010/0123722 A1    May 20, 2010

(51) Int. Cl.
*G06T 13/00* (2011.01)
*G06F 3/048* (2013.01)

(52) U.S. Cl.
USPC .......................... 345/473; 715/763; 715/765

(58) Field of Classification Search
USPC .................................. 345/473; 715/763–765
See application file for complete search history.

(56) References Cited

U.S. PATENT DOCUMENTS

| | | | |
|---|---|---|---|
| 5,321,829 A | 6/1994 | Zifferer | |
| 5,408,603 A | 4/1995 | Van de Lavoir et al. | |
| 5,838,588 A | 11/1998 | Santoso et al. | |
| 6,477,435 B1 | 11/2002 | Ryan et al. | |
| 2002/0101431 A1* | 8/2002 | Forney et al. | 345/582 |
| 2003/0084201 A1 | 5/2003 | Edwards et al. | |
| 2004/0075689 A1* | 4/2004 | Schleiss et al. | 345/771 |
| 2005/0102651 A1 | 5/2005 | Ueda | |
| 2008/0234986 A1* | 9/2008 | Chen et al. | 703/1 |

FOREIGN PATENT DOCUMENTS

| | | |
|---|---|---|
| GB | 2395801 A | 6/2004 |
| GB | 2448841 A | 10/2008 |

OTHER PUBLICATIONS

GB Search Report for GB Patent Application GB0919409.3; Dated Feb. 16, 2010.

* cited by examiner

*Primary Examiner* — Xiao M. Wu
*Assistant Examiner* — Scott E Sonners
(74) *Attorney, Agent, or Firm* — Cantor Colburn LLP

(57) ABSTRACT

A method for displaying a control system comprising, receiving a function block diagram file including a function block having an associated logic function, receiving an animation instruction associated with the function block, receiving system data from a system controller, receiving a first graphic associated with the logic function from a function block library, processing the first graphic and the system data according to the animation instruction to render an updated first graphic reflecting the systems data, and displaying the function block and the rendered updated first graphic associated with the logic function.

18 Claims, 4 Drawing Sheets

Selection input signal status: False

Selection input signal status: True

SYSTEMS AND METHODS INVOLVING GRAPHICALLY DISPLAYING CONTROL SYSTEMS

BACKGROUND OF THE INVENTION

The subject matter disclosed herein relates to control system logic displayed using a graphical user interface (GUI) that presents logic functions and paths using function blocks and path connector lines. The function blocks include input pins that receive signals. The function blocks perform a defined logic function and output the results of the logic function with output pins. The input and output pins of function blocks are connected by path connectors lines (wires) to complete the system logic.

The GUI is used to design control system logic functions that may be compiled and used in processors that control real world systems such as, for example, electrical power systems that include electrical generators. One advantage of using a GUI to display control systems logic is that the control system logic functions may be displayed to a user or technician while a system is operating in real time. The display of the connected function blocks allows a user to analyze the operation of the control system in detail. The detailed analysis improves trouble shooting procedures and enhances the ability of technicians to tailor the control system to more effectively control the system.

Existing GUIs that display function block logic processes fail to graphically provide a detailed view of the logic process desired for analyzing the system. A system and method that provides a more detailed and intuitive presentation of the logic process is desirable.

BRIEF DESCRIPTION OF THE INVENTION

According to one aspect of the invention, an exemplary method for displaying a control system comprising, receiving a function block diagram file including a function block having an associated logic function, receiving an animation instruction associated with the function block, receiving system data from a system controller, receiving a first graphic associated with the logic function from a function block library, processing the first graphic and the system data according to the animation instruction to render an updated first graphic reflecting the systems data, and displaying the function block and the rendered updated first graphic associated with the logic function.

According to another aspect of the invention, an exemplary system for displaying a control system comprising, a memory operative to store a function block library including a first graphic associated with a logic function, a display, a controller operative to control a system with the logic function, and a processor. The processor is operative to receive a function block diagram file including a function block having an associated logic function, receive an animation instruction associated with the function block, receive system data from a system controller, receive a first graphic associated with the logic function from a function block library, process the first graphic and the system data according to the animation instruction to render an updated first graphic reflecting the systems data, and send the function block and the rendered updated first graphic associated with the logic function to the display.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Graphical user interfaces (GUI) may be used to design and operate control systems. For example, a function block editor application may be used to graphically design and display function block diagrams. Function block diagrams are used to graphically display control system functions. Function block diagrams include function blocks that perform logic functions in a control system. The input and output pins of function blocks are connected with lines (wires) that input and output signals from the function blocks in the control system.

Once a control system has been designed using a function block editor application, the graphical representation of the control system logic may be compiled and processed in a controller that controls a system. For example, electrical power systems are controlled by a controller that receives signals from sensors in the electrical power system, and processes the signals using the control system logic, and issues control signals to the electrical power system. The sensor signals may include, for example, temperature readings, oil pressure readings, fuel pressure readings, voltage readings, and the speed of a turbine. The readings are processed by the control system logic in the controller that sends control signals to control the electrical power system.

The function block editor application may run and receive system data representing sensor readings and control signals in real time from a controlled system. The function block editor may graphically display the connected function blocks and the signals input and output at the function block pins. However, previous function block editor applications do not graphically display the logic process of a particular function block, or graphically indicate a state of the function block in real time. A user of previous function block editor applications used knowledge of the function blocks and the states of the input signals to manually determine the operation of the function blocks. Previous function block editor applications lacked the intuitive features of graphically representing the function block operations in real time that increase the efficiency and effectiveness of analyzing the operation of a control system.

Figure 1:
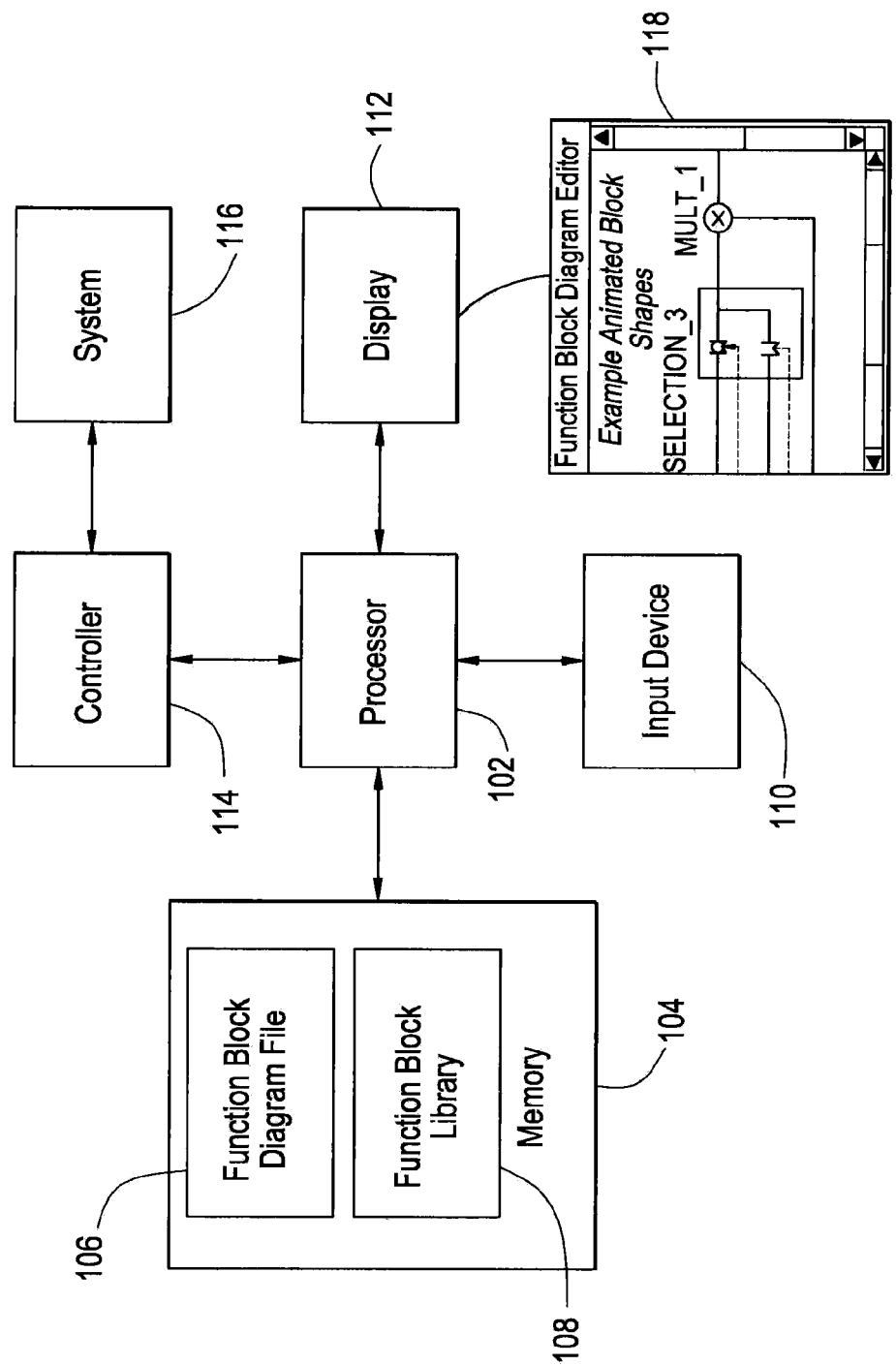
FIG. 1 illustrates an exemplary embodiment of a control system and GUI interface.

FIG. 1 illustrates an exemplary embodiment of a system that includes a processor 102 that is operative to run the function block editor application. The processor 102 is communicatively connected to a memory 104 that stores function block diagram files 106 and a function block library 108. The processor is also communicatively connected to an input device 110, a display device 112, and a controller 114. The controller 114 is communicatively connected to a system 116 that may, for example, include a power generating system including an electrical generator.

In operation, the function block editor application is run on the processor 102 and is graphically displayed using a GUI on the display device 112. A user uses the input device 110 to input commands to the function block editor application. The user may design control system logic graphically by retrieving function blocks from the function block library 108, defining the logic process of the function blocks and connecting the function blocks with lines (wires). Once the control system logic is defined, the control system logic is saved as a function block diagram file 106 in the memory 104. The function block diagram file 106 may be compiled by the processor 102 and sent to the controller 114. The controller 114 receives signals from the system 116, processes the signals using the control system logic in the function block diagram file 106, and outputs control signals to the system 116.

The function block editor application may be run in real time as the system 116 is in operation; allowing a user to analyze the operation of the system and the control system logic. In real time operation, the controller 114 sends data that includes signals from the system 116 and the output control signals sent to the system 116 to the processor 102. The function block editor application displays the function blocks and wires of the control system logic (the control system block diagram) with the real time system data received from the system 114 via the controller 114. An example of a graphical window 118 displaying a portion of a control system block diagram is shown in FIG. 1. The real time display of the control system block diagram is animated and changes with the state of the system 114. The animation includes updating and displaying the states of the input and output signals and graphically representing the logic process of the function blocks. Details of the graphical representation of the logic processes of the function blocks will be explained below.

Figure 2:
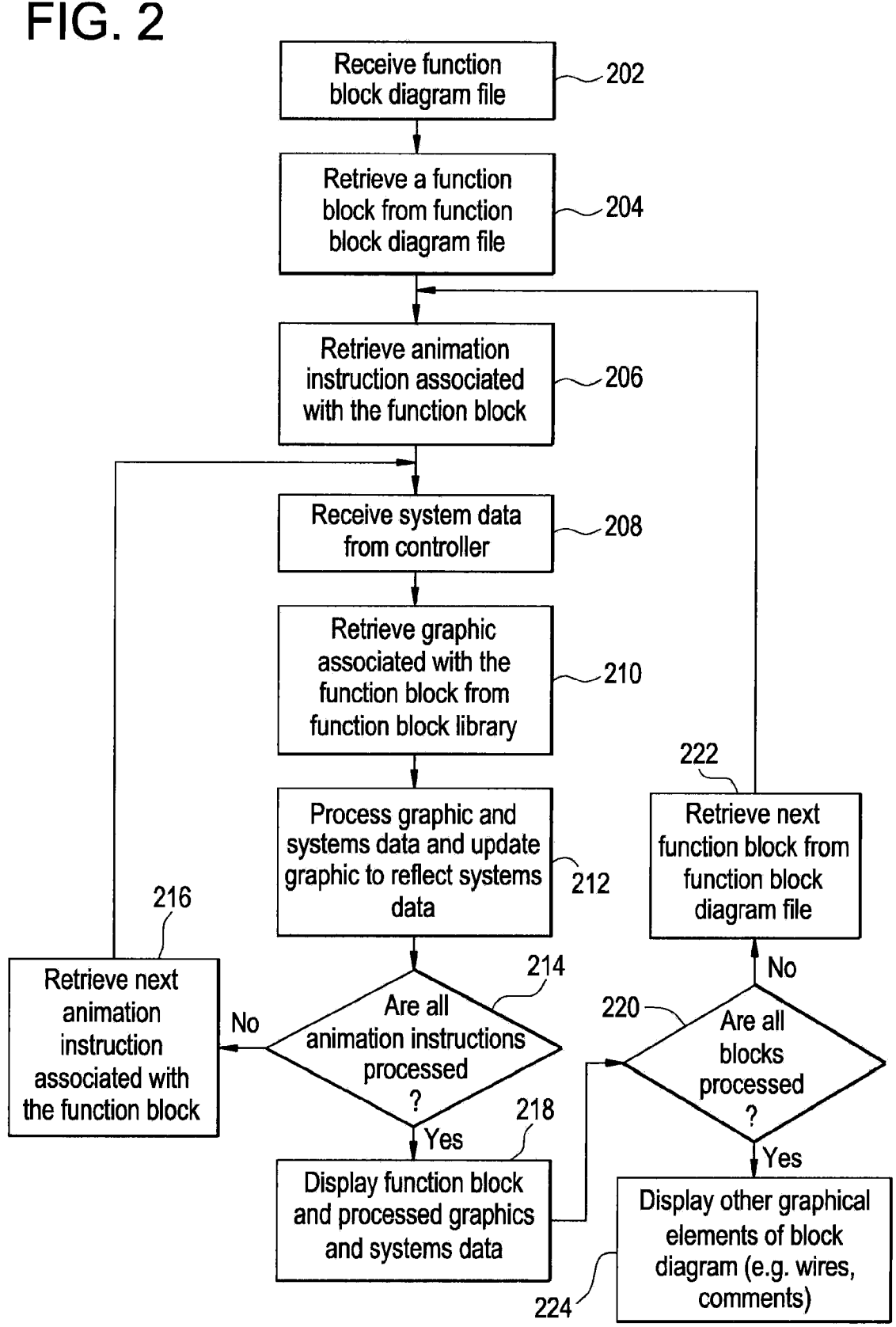
FIG. 2 illustrates a block diagram of an exemplary method for processing and displaying an animated control system block diagram.

FIG. 2 illustrates a block diagram of an exemplary method for processing and displaying an animated control system block diagram. In block 202, the function block diagram file is received. A function block is retrieved from the function block diagram file in block 204. In block 206, an animation instruction is retrieved. The animation instruction may be included in the function block diagram file, and associates the function block with graphics associated with the function block. The animation instruction may also include logic that determines how to update and render a graphic and associated system data. In block 208, systems data is received from the controller 114. In block 210, animation graphics that are associated with the function block are retrieved from the function block library. The animation graphics and systems data are processed according to the animation instruction in block 212. In block 214, if all of the animation instructions have not been processed, the next animation instruction associated with the function block is retrieved in block 216. If all of the animation instructions have been processed, the function block and processed graphics and systems data are displayed in block 218. Block 220 determines if all of the blocks in the function block diagram file have been processed. If no, the next function block from the function block diagram file is retrieved in block 222. If yes, additional animation graphics are retrieved from the function block library in block 224. In block 224, the additional animation graphics are displayed. The additional animation graphics allow logic functions of a function block to be represented with a number of animation graphics allowing the logic function and logic state of the function block to be presented more clearly and with more detail to a user.

Figure 3:
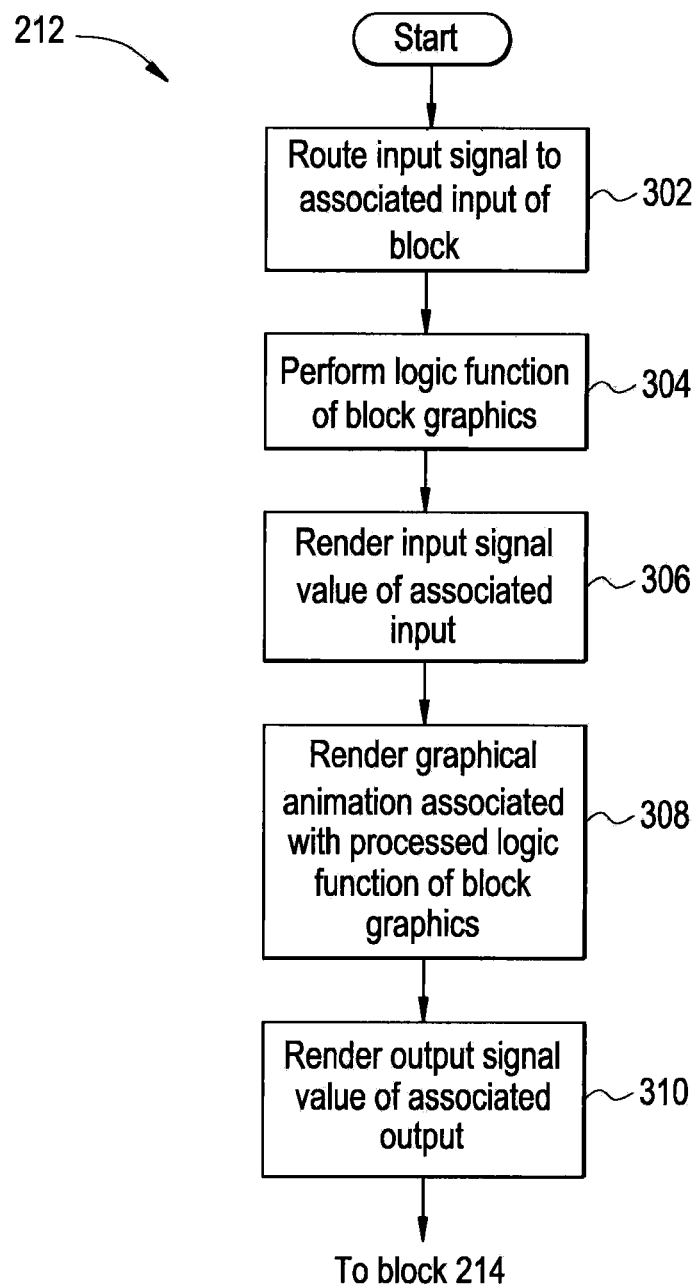
FIG. 3 illustrates a block diagram of an exemplary method of processing the function block diagram logic and updating the animation graphics in block 218 (of FIG. 2).

FIG. 3 illustrates a block diagram of an exemplary method of processing the function block diagram logic and updating the animation graphics in block 212 (of FIG. 2). Once the system data is received from the controller (from block 216 of FIG. 2), input signals are routed to associated inputs of a function block in block 302. In block 304, the logic function associated with the function block graphics is performed. The input signal value of the associated input is rendered in block 306. In block 308, graphical information including animation associated with the processed logic function block graphics is rendered. The output signal value of the function block is rendered in block 310. Once all of the function block graphic has been processed, the method moves to block 214 (of FIG. 2).

Figure 4:
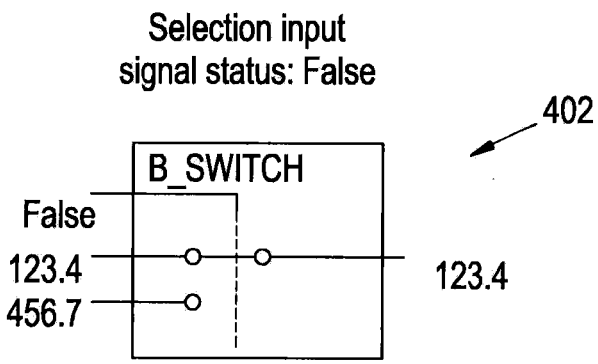
FIGS. 4 and 5 illustrate examples of function blocks and animation associated with the function blocks.
Figure 4:
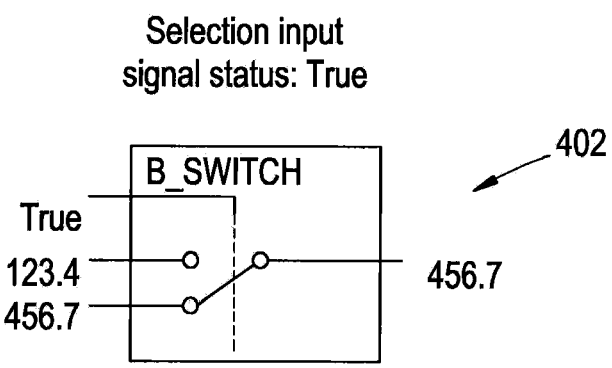
Figure 5:
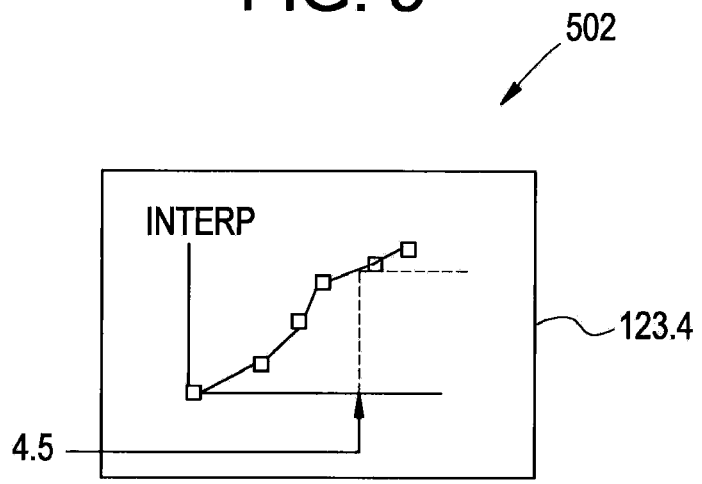

FIGS. 4 and 5 illustrate examples of function blocks and animation (graphics) associated with the function blocks. Referring to FIG. 4, an example function block 402 is shown. The upper function block 402 illustration shows a function block associated with a switch logic function. The upper function block 402 shows the status of the switch when a selection input signal is "false." When the selection input signal is false, the associated animation displays the switch as closed, and the function logic processes the input signal (123.4) to be an output signal (123.4). The lower function block 402 shows the graphical animation when the selection input signal is "true." When the selection input signal is true, the switch opens to a second pole having an input signal (456.7). The function logic processes the input signal (456.7) to be an output signal (456.7). The animation may, for example, color code the graphical representation of the selection input signal line to correspond to the "true" and "false" states of the signal. The position of the switch may change to graphically represent the state of the switch.

Referring to FIG. 5, an example function block 502 is shown. The function block 502 is associated with an interpolation function. For example, the interpolation function includes an X-Y function that is represented by a graph. For a given X input (4.5) the X-Y function determines a Y output value (123.4), and may interpolate the graph to determine an appropriate Y output value. As the X input value changes, the Y output value changes, and the graphical representation of the X-Y function (animation) is updated graphically to represent the changes. The function block 502 allows a user to visually analyze the X-Y function as the X input changes. The shape of the function is useful to a user analyzing the performance of the system. By displaying the X-Y function graphically in the function block 502, a user may quickly determine the type of X-Y function being interpolated, and may more effectively and efficiently analyze the system.

Technical effects and benefits of the systems and methods described above include methods and systems that allow a user to quickly analyze and determine the operations and states of function blocks in a function block diagram for a control system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for displaying a graphical representation of a physical control system, the method comprising:
  receiving in a processor a function block diagram file including a function block defining a logic process to be executed by the physical control system;
  receiving in the processor an animation instruction associated with the function block;
  receiving system data in a system controller, the system data indicative of a physical state of the physical control system, the system controller processing the system data using the logic process defined by the function block diagram file and outputting a control signal to the physical control system based on the processing using the logic process;
  receiving the system data in the processor;
  receiving in the processor a first graphic displaying the logic process from a function block library;
  processing with the processor the first graphic and the system data according to the animation instruction to render an updated first graphic reflecting the systems data; and
  displaying the function block and the rendered updated first graphic associated with the logic process on a display.

2. The method of claim 1, wherein the method further comprises displaying an associated input signal and an associated output signal responsive to processing the first graphic.

3. The method of claim 1, wherein the method further comprises:
  receiving a second graphic associated with the logic process from a function block library;
  processing the second graphic and the system data according to the animation instruction to render an updated second graphic reflecting the systems data; and
  displaying the function block and the rendered updated second graphic associated with the logic process.

4. The method of claim 1, wherein the function block diagram file further includes a line associated with the input signal.

5. The method of claim 4, wherein the method further comprises displaying the line responsive to displaying the function block and the first graphic associated with the logic process.

6. The method of claim 1, wherein the function block diagram file further includes a textual comment associated with the function block.

7. The method of claim 6, wherein the method further comprises displaying the textual comment associated with the function block responsive to displaying the function block and the first graphic associated with the logic process.

8. The method of claim 1, wherein the first graphic includes a non-textual indication of a state of an input signal.

9. The method of claim 3, wherein the second graphic includes a non-textual indication of a state of an output signal.

10. A system for displaying a control system comprising:
  a memory operative to store a function block library including a first graphic associated with a logic process;
  a display;
  a system controller operative to control a physical system with the logic process; and
  a processor operative to receive a function block diagram file including a function block defining the logic process to be executed by the physical control system, receive an animation instruction associated with the function block, receive system data from the system controller the system data indicative of a physical state of the physical system, receive the first graphic displaying the logic process from a function block library, process the first graphic and the system data according to the animation instruction to render an updated first graphic reflecting the system data, and send the function block and the rendered updated first graphic associated with the logic process to the display.

11. The system of claim 10, wherein the processer is further operative to render and send an associated input signal and an associated output signal to the display responsive to processing the first graphic.

12. The system of claim 10, wherein the processer is further operative to receive a second graphic associated with the logic process from a function block library, process the second graphic and the system data according to the animation instruction to render an updated second graphic reflecting the systems data, and send the function block and the rendered updated second graphic associated with the logic process to the display.

13. The system of claim 10, wherein the function block diagram file further includes a line associated with the input signal.

14. The system of claim 13, wherein the processer is further operative to render and send the line to the display responsive to sending the function block and the first graphic associated with the logic process to the display.

15. The system of claim 10, wherein the function block diagram file further includes a textual comment associated with the function block.

16. The system of claim 15, wherein the processer is further operative to render and send the textual comment associated with the function block to the display responsive to sending the function block and the first graphic associated with the logic process to the display.

17. The system of claim 10, wherein the first graphic includes a non-textual indication of a state of an input signal.

18. The system of claim 12, wherein the second graphic includes a non-textual indication of a state of an output signal.

* * * * *